United States Patent Office 3,355,461
Patented Nov. 28, 1967

3,355,461
STEROIDAL LACTONES AND THEIR
PREPARATION
Patrick A. Diassi, Westfield, N.J., assignor, by mesne assignments, to E. R. Squibb & Sons, Inc., New York, N.Y., a corporation of Delaware
No Drawing. Filed Aug. 30, 1965, Ser. No. 483,783
4 Claims. (Cl. 260—343.2)

ABSTRACT OF THE DISCLOSURE

This invention relates to new steroids of the 17-oxa-D-homo-$\Delta^4$-pregnene-3,16,20-trione and 17-oxa-D-homo-A-nor-$\Delta^3$-pregnene-2,16,20-trione series, which may contain additional double-bonds in the 1,2 and/or 6,7-positions, halogen or lower alkyl substituents in the 9α or 12α-positions, a β-hydroxy or oxo group in the 11-position, a lower alkyl or halogen substituent in the 6-position, and a halogen, hydroxy or acyloxy substituent in the 21-position. These compounds are physiologically active substances that possess progestational activity, if unsubstituted in the C-ring, and glucocorticoid activity if they contain an 11β-hydroxy or 11-keto group. The compounds are prepared from the corresponding $\Delta^4$-pregnene-17α-ol-3,16,20-trione or A-nor-$\Delta^3$-pregnene-17α-ol-2,16,20-trione by treating the latter with a strong base.

This invention relates to new chemical compounds and more particularly to new steroids of the 17-oxa-D-homo-$\Delta^4$-pregnene-3,16,20-trione (including the pregnadiene and pregnatriene) and 17-oxa-D-homo-A-nor-$\Delta^3$-pregnene-2,16,20-trione series.

Although the invention includes all steroids of the 17-oxa-D-homo-$\Delta^4$-pregnene-3,16,20-trione and 17-oxa-D-homo-A-nor-$\Delta^3$-pregnene-2,16,20-trione series, the particularly preferred compounds are those of the formula

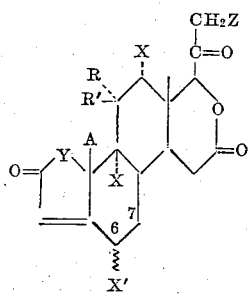

wherein Y is methylene (—CH$_2$—), ethylene (—CH$_2$CH$_2$—)

or vinylene (—CH=CH—); the 6,7-position is either saturated or double-bonded; A is hydrogen or methyl; R is hydrogen, R' is hydrogen or hydroxy, or together R and R' is oxo (=O); each X is hydrogen, halogen (preferably chloro or fluoro), or lower alkyl, at least one X being hydrogen or lower alkyl; X' is hydrogen, lower alkyl, or halogen (preferably chloro or fluoro), in either the alpha or beta position; and Z is hydrogen, halogen, hydroxy, or acyloxy, the acyloxy group preferably being that of a hydrocarbon carboxylic acid of less than twelve carbon atoms, as exemplified by the lower alkanoic acids (e.g., acetic and propionic acid), the lower alkenoic acids, the monocyclic aryl carboxylic acids (e.g., benzoic acid), the monocyclic ar(lower alkanoic acids) (e.g., phenacetic and β-phenylpropionic acid), the cycloalkanecarboxylic acids, and the cycloalkenecarboxylic acids.

The new steroids of this invention are physiologically active substances. Those unsubstituted in the C-ring possess progestational activity and hence may be used in lieu of and in the same manner as progesterone in treatment of conditions for which progesterone is used. Those containing an 11β-hydroxy or 11-keto group possess glucocorticoid activity and hence may be used in lieu of and in the same manner as hydrocortisone in the treatment of conditions for which hydrocortisone is used.

The new steroids of this invention are prepared by reacting a corresponding steroid of the $\Delta^4$-pregnene-17α-ol-3,16,20-trione or A-nor-$\Delta^3$-pregnene-17α-ol-2,16,20-trione series with a strong base, such as an alkali metal hydroxide (e.g., sodium hydroxide) or metal alkoxide (e.g., potassium t-butoxide or sodium methoxide) in a suitable solvent such as water, methanol, ethanol and other alcohols, dioxane, dimethylformamide or combinations of these solvents.

Suitable starting steroids can be prepared as disclosed in U.S. patent application, Ser. No. 443,080, filed Mar. 26, 1965, now matured to Patent No. 3,316,156, and include 17α-hydroxy-16-ketoprogesterone,
17α-hydroxy-16-keto-A-norprogesterone,
17α-hydroxy-16-keto-1-dehydroprogesterone,
17α-hydroxy-16-keto-6-dehydroprogesterone,
17α-hydroxy-16-keto-1,6-tetradehydroprogesterone,
17α-hydroxy-16-keto-11-desoxycorticosterone and 21-esters thereof, 6α-methyl-17α-hydroxy-16-ketoprogesterone,
6β-chloro-17α-hydroxy-16-ketoprogesterone,
6α-fluoro-17α-hydroxy-16-ketoprogesterone,
9α-halo-11β,17α-dihydroxy-16-ketoprogesterones (such as 9α-fluoro-11β,17α-dihydroxy-16-ketoprogesterone), 9α-halo-17α-hydroxy-11,16-diketoprogesterones,
9α-halo-11β,17α-di-hydroxy-16-keto-1-
  dehydroprogesterones,
9α-halo-11β,17α-dihydroxy-16-keto-6-
  dehydroprogesterones,
6α,9α-dihalo-11β-17α-dihydroxy-16-ketoprogesterones,
9α-halo-16-keto-hydrocortisones and 21-esters thereof (such as 9α-fluoro-16-ketohydrocortisone and its 21-acetate), 9α-halo-16-keto-prednisolones and 21-esters thereof (such as 9α-fluoro-16-keto-prednisolone and its 21-acetate), 9α-halo-16-keto-6-dehydrocortisones and 21-esters thereof, 9α,21-dihalo-11β,17α-dihydroxy-16-ketoprogesterones,
9α,21-dihalo-11β,17α-dihydroxy-16-keto-1-
  dehydroprogesterones,
9α,21-dihalo-11β,17α-dihydroxy-16-keto-6-
  dehydroprogesterones,
9α-halo-11β,17α-dihydroxy-16-keto-A-norprogesterones,
17α-hydroxy-16-keto-19-norprogesterone,
17α-hydroxy-16-keto-19-norcorticosterone,
6α-halo-16-keto-hydrocortisones and their 21-esters, 6α-halo-16-keto-prednisolones and their 21-esters, 6α,9α-dihalo-16-keto-hydrocortisones and their 21-esters, 6α,9α-dihalo-16-keto-prednisolones and their 21-esters, 16-ketohydrocortisone and its 21-esters, and 16-ketoprednisolone and its 21-esters.

The following examples illustrate the invention (all temperatures being in centigrade):

EXAMPLE 1

*17aβ-acetyl-17-oxa-D-homo-androst-4-ene-3,16-dione*

To a suspension of 100 mg. of 16-keto-17α-hydroxyprogesterone in 10 ml. of methanol a solution of 100 mg. of sodium hydroxide in 2 ml. of water are added and the resulting solution stirred at room temperature, under nitrogen, for one hour. The solution is then acidified to pH 2 with dilute hydrochloric acid, diluted with water and extracted with chloroform. The chloroform is washed with water, dried over sodium sulfate and evaporated under reduced pressure. Crystallization of the residue from acetone-hexane gives about 53 mg. of 17aβ-acetyl-17-oxa-D-homo-androst-4-ene-3,16-dione having a melting point about 205–207°, $[\alpha]_D^{25}$ +3.6° (chloroform), $\lambda_{max}^{alc.}$ 239 mµ (ε, 14,600), $\lambda_{max}^{Nujol}$ 5.71, 5.84, 6.01, 6.20µ $\tau_{DCCl_3}^{Si(Me)_4}$ 4.27 (s., 4—H), 5.75 (s., 17aα—H), 7.71 (s., 21 —CH$_3$), 8.81 (s., 19—CH$_3$), 9.01 (s., 18—CH$_3$)

*Analysis.*—Calcd. for C$_{21}$H$_{28}$O$_4$ (344.44): C, 73.22; H, 8.19. Found: C, 73.22; H, 8.19.

EXAMPLE 2

*17β-acetyl-17-oxa-D-homo-A-norandrost-2-ene-2,16-dione*

Following the procedure of Example 1 but substituting 16-keto-17α-hydroxy-A-norprogesterone for the 16-keto-17α-hydroxyprogesterone there are obtained about 39 mg. of 17aβ - acetyl - 17 - oxa - D - homo - A - norandrost-3-ene-2,16-dione having a melting point about 170–172°, $[\alpha]_D^{24}$ —105° (chloroform), λmax. 232 mµ (ε, 17,200), $\lambda_{Nux.}^{nuoli}$ 5.74, 5.87, 5.95 (sh.), 6.17µ, $\tau_{DCCl_3}^{Si(Me)_4}$ 4.24 (s., 3—H), 5.74 (d., J=1 c.p.s., 17aα—H), 7.71 (s., 21—CH$_3$), 8.83 (s., 19—CH$_3$, 9.00 (s., 18—CH$_3$)

Similarly, by following the procedure of Example 1, but substituting the indicated substituted 16-keto-17α-hydroxy-progesterone for the 16-keto-17α-hydroxyprogesterone in the example, the indicated substituted 17aβ-acetyl-17-oxa-D-homo-androst-4-ene-3,16-dione is obtained.

| Example | Substituted 16-keto-17α-hydroxyprogesterone Reactant | Substituted 16-keto-17aβ-acetyl-17-oxa-D-homo-androst-4-ene-3, 16-dione Product |
|---|---|---|
| 3 | 1-dehydro | 1-dehydro. |
| 4 | 6-dehydro | 6-dehydro. |
| 5 | 1,6-tetradehydro | 1,6-tetradehydro. |
| 6 | 21-hydroxy | 21-hydroxy. |
| 7 | 6α-methyl | 6α-methyl. |
| 8 | 6β-chloro | 6β-chloro. |
| 9 | 6α-fluoro | 6α-fluoro. |
| 10 | 9α-fluoro-11β-hydroxy | 9α-fluoro-11β-hydroxy. |
| 11 | 9α-fluoro-11-keto | 9α-fluoro-11-keto. |
| 12 | 9α-fluoro-11β-hydroxy-1-dehydro | 9α-fluoro-11β-hyrdoxy-1-dehydro. |
| 13 | 9α-fluoro-11β-hydroxy-6-dehydro | 9α-fluoro-11β-hydroxy-6-dehydro. |
| 14 | 6α,9α-difluoro-11β-hydroxy | 6α,9α-difluoro-11β-hydroxy. |
| 15 | 9α-fluoro-11-keto-21-hydroxy | 9α-fluoro-11-keto-21-hydroxy. |
| 16 | 9α-fluoro-11β,21-dihydroxy | 9α-fluoro-11β-21-dihydroxy. |
| 17 | 9α-fluoro-11β,21-dihydroxy-1-dehydro | 9α-fluoro-11β,21-dihydroxy-1-dehydro. |
| 18 | 9α-21-difluoro-11β-hydroxy | 9α,21-difluoro-11β-hydroxy. |
| 19 | 9α,21-difluoro-11β-hydroxy-1-dehydro | 9α,21-difluoro-11β-hydroxy-1-dehydro. |
| 20 | 19-nor | 19-nor. |
| 21 | 19-nor-21-hydroxy | 19-nor-21-hydroxy. |
| 22 | 6α-fluoro-11β,21-dihydroxy | 6α-fluoro-11β,21-dihydroxy. |
| 23 | 6β-fluoro-11β,21-dihydroxy | 6β-fluoro-11β,21-dihydroxy. |
| 24 | 6α-fluoro-11β,21-dihydroxy-1-dehydro | 6α-fluoro-11β,21-dihydroxy-1-dehydro. |
| 25 | 6α,9α-difluoro-11β,21-dihydroxy | 6α,9α-difluoro-11β,21-dihydroxy. |
| 26 | 6α,9α-difluoro-11β,21-dihydroxy-1-dehydro | 6α,9α-difluoro-11β,21-dihydroxy-1-dehydro. |

Similarly, by following the procedure of Example 2, but substituting the indicated substituted 16-keto-17α-hydroxy-A-norprogesterone for the 16-keto-17α-hydroxy-A-norprogesterone in the example, the indicated substituted 17β-acetyl - 17 - oxa - D - homo - A - norandrost - 3 - ene-2,16-dione is obtained:

| Example | Substituted 16-keto-17α-hydroxy-A-progesterone Reactant | Substituted 16-keto-17aβ-acetyl-17-oxa-D-homo-A-norandrost-3-ene-2, 16-dione Product |
|---|---|---|
| 27 | 6-dehydro | 6-dehydro. |
| 28 | 21-hydroxy | 21-hydroxy. |
| 29 | 6α-methyl | 6α-methyl. |
| 30 | 6β-chloro | 6β-chloro. |
| 31 | 6α-fluoro | 6α-fluoro. |
| 32 | 9α-fluoro-11β-hydroxy | 9α-fluoro-11β-hydroxy. |
| 33 | 9α-fluoro-11-keto | 9α-fluoro-11-keto. |
| 34 | 9α-fluoro-11β-hydroxy-6-dehydro | 9α-fluoro-11β-hydroxy-6-dehydro. |
| 35 | 6α,9α-difluoro-11β-hydroxy | 6α,9α-difluoro-11β-hydroxy. |
| 36 | 9α-fluoro-11-keto-21-hydroxy | 9α-fluoro-11-keto-21-hydroxy. |
| 37 | 9α-fluoro-11β,21-dihydroxy | 9α-fluoro-11β,21-dihydroxy. |
| 38 | 9α,21-difluoro-11β-hydroxy | 9α,21-difluoro-11β-hydroxy. |
| 39 | 19-nor | 19-nor. |
| 40 | 19-nor-21-hydroxy | 19-nor-21-hydroxy. |
| 41 | 6α-fluoro-11β,21-dihydroxy | 6α-fluoro-11β,21-dihydroxy. |
| 42 | 6β-fluoro-11β,21-dihydroxy | 6β-fluoro-11β,21-dihydroxy. |
| 43 | 6α,9α-difluoro-11β,21-dihydroxy | 6α,9α-difluoro-11β,21-dihydroxy. |

This invention may be variously otherwise embodied within the scope of the appended claims:

What is claimed is:
1. A compound selected from the group consisting of steroids of the formula

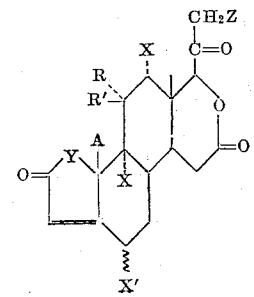

and the 6,7-dehydro derivatives thereof, wherein Y is selected from the group consisting of methylene, ethylene and vinylene; A is selected from the group consisting of hydrogen and methyl; R is hydrogen, R' is selected from the group consisting of hydrogen and hydroxy, and together R and R' is oxo; each X is selected from the group consisting of hydrogen, chlorine, fluorine and lower alkyl, at least one X being selected from the group consisting of hydrogen and lower alkyl; X' is selected from the group consisting of hydrogen, lower alkyl, chlorine and fluorine; and Z is selected from the group consisting of hydrogen, chlorine, fluorine, hydroxy and the acyloxy radical of a hydrocarbon carboxylic acid of less than twelve carbon atoms.

2. 17aβ - acetyl - 17 - oxa - D - androst - 4 - ene - 3,16-dione.

3. 17aβ - acetyl - 17 - oxa - D - homo - A - norandrost-3-ene-2,16-dione.

4. A process for preparing a compound of claim 1, which comprises interacting a compound selected from the group consisting of steroids of the formula

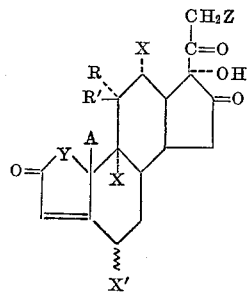

and the 6,7-dehydro derivatives thereof, wherein Y, A, R, R', X, X' and Z are as defined in claim 2, with a strong base.

No references cited.

JAMES C. PATTEN, *Primary Examiner.*

UNITED STATES PATENT OFFICE
CERTIFICATE OF CORRECTION

Patent No. 3,355,461

November 28, 1967

Patrick A. Diassi

It is hereby certified that error appears in the above numbered patent requiring correction and that the said Letters Patent should read as corrected below.

Column 3, line 52, for "-2-ene-", in italics, read -- -3-ene- --, in italics; column 4, line 2, for $\lambda_{Nux.}^{maolj}$ read $\lambda_{max.}^{Nujol}$ column 5, line 16, for "-D-androst-" read -- -D-homo-androst- --; column 6, line 17, for the claim reference numeral "2" read -- 1 --.

Signed and sealed this 24th day of December 1968.

(SEAL)
Attest:

Edward M. Fletcher, Jr.
Attesting Officer

EDWARD J. BRENNER
Commissioner of Patents